United States Patent [19]

Tornero

[11] Patent Number: 4,740,417
[45] Date of Patent: Apr. 26, 1988

[54] THERMOPLASTIC VACUUM MOLDING METHOD AND ARTICLE PRODUCED THEREBY

[75] Inventor: Roger Tornero, Greensboro, N.C.

[73] Assignee: Cone Mills Corporation, Greensboro, N.C.

[21] Appl. No.: 888,192

[22] Filed: Jul. 22, 1986

[51] Int. Cl.⁴ .................. B29C 51/10; B32B 1/00; B32B 31/14
[52] U.S. Cl. .................. 428/308.4; 156/222; 156/224; 156/245; 156/309.6; 156/285; 264/321; 264/511; 264/553; 264/DIG. 78; 428/309.9; 428/316.6
[58] Field of Search ............ 156/285, 222, 224, 245, 156/309.6; 264/101, 321, 510, 512, DIG. 78, 511, 553; 428/304.4, 319.3, 319.7, 319.9, 306.6, 307.3, 308.4, 308.8, 316.6

[56] References Cited

U.S. PATENT DOCUMENTS

| | | | |
|---|---|---|---|
| 2,814,077 | 11/1957 | Moncrieff | 156/285 |
| 3,256,131 | 12/1962 | Kock et al. | 428/319.7 |
| 3,446,685 | 5/1969 | Goldstone et al. | 156/285 |
| 3,446,686 | 5/1969 | Butler et al. | 156/285 |
| 3,962,392 | 6/1976 | Conner | 264/512 |
| 4,104,430 | 8/1978 | Fenton | 428/319.7 |
| 4,201,612 | 5/1980 | Figge et al. | 156/285 |
| 4,350,734 | 9/1982 | Hammond | 428/308.4 |
| 4,373,057 | 2/1983 | Hammond | 524/700 |
| 4,395,530 | 7/1983 | Hammond | 528/48 |
| 4,400,422 | 8/1983 | Smith | 428/160 |

FOREIGN PATENT DOCUMENTS

| | | | |
|---|---|---|---|
| 664452 | 6/1963 | Canada | 428/319.9 |
| 60-48324 | 3/1985 | Japan | 264/511 |
| 1364455 | 8/1974 | United Kingdom | 428/319.7 |

Primary Examiner—William J. Van Balen
Attorney, Agent, or Firm—Griffin, Branigan, & Butler

[57] ABSTRACT

A vacuum molding process for adhering a porous, foam-backed fabric 50 to a thermoplastic substrate 60 and for providing a nonplanar contour to the substrate 60 with fabric 50 adhered thereto. The porous, foam-backed fabric 50 is loosely positioned over a female mold 30. The substrate 60 is heated sufficiently for the substrate 60 to sag. The sagging substrate 60 is deposited over the female mold 30 in a manner whereby the substrate 60 contacts the fabric 50 around an effective mold perimeter 36. A vacuum applied through the female mold 30 is transmitted through the porous foam-backed fabric 50 and attracts the sagging substrate 60 into the mold 30. The attraction causes contact and adhesion of the heated substrate 60 and the foam-backed fabric 50.

20 Claims, 3 Drawing Sheets

THERMOPLASTIC VACUUM MOLDING METHOD AND ARTICLE PRODUCED THEREBY

BACKGROUND

I. Field of the Invention

This invention pertains to a method of adhering or bonding material to a rigid substrate and an article produced thereby, and particularly to a method and article wherein fabric is adhered to a thermoplastic substrate using vacuum molding techniques.

II. Prior Art and Other Considerations

Numerous commercial products are formed by adhering a fabric to a rigid substrate. Adhering the fabric to a nonplanar substrate is quite difficult especially when it is required that the adhered fabric have the same profile or contour as the nonplanar substrate. One good example of such a product is an interior door panel incorporated into a vehicle such as an automobile.

When finally assembled, the contour of a vehicular interior door panel is generally fairly intricate for both functional and aesthetic reasons. Typically, the interior door panel contours have sizeable functional protrusions (such as an armrest, for example) and ridges or depressions that enhance the decorative appearance of the door.

It is generally desired that all contour features associated with the interior door panel be comfortable to the touch and appealing to the eye, for which reasons each contour feature is generally covered with a layer of fabric. Conventional fabrication techniques have not afforded a method for easily but securely adhering a single piece of fabric onto a unitary interior door panel substrate of nonplanar contour. Consequently, interior panels are generally formed as a composite, i.e., by separately adhering fabric to each of a plurality of separately-formed door panel substrate sections and then securing the separately-formed door panel substrate sections to one another (as by affixing an armrest to an essentially planar panel section, for example).

In accordance with conventional techniques, a fabric having a suitable backing (such as vinyl, for example) is employed. The fabric is cut into a plurality of pieces, each fabric piece being appropriately sized in view of the particular panel substrate section to which it is to be adhered. Glue is applied to the fabric backing, and the glued fabric backing is placed over its corresponding panel substrate section. Once the fabric adheres to its corresponding panel substrate section, the section is affixed by fasteners or otherwise to other substrate sections which form the interior door panel structure. Often a trim material or the like is used to cover the points at which the affixed door sections boarder one another. Thus, numerous steps involving considerable amount of time and labor are required to produce an interior door panel.

Interior door panels are constructed as a composite rather than by adhering a single piece of fabric to a unitary interior door panel substrate in view of the extraordinary difficulty in gluing a single piece fabric to the complex contours of the substrate in a manner whereby the fabric closely clings to the substrate contour, particulary in crevices. Without the ability to properly glue the fabric, the contour of the fabric is somewhat haphazard and does not have the sharp definition of the substrate contour.

The use of a male mold (such as mold 20 in FIG. 1) has been proposed for vacuum molding techniques wherein it is desired to securely adhere a fabric onto onto a rigid nonplanar substrate. According to this proposal and as shown in FIG. 1A, a fabric 22 is first laminated to a thermoplastic substrate 24 using an adhesive. Both the fabric 22 and the substrate 24 must be capable of considerale dimensional elongation on the order of at least 60% to 70%. Fabrics having such elongative properties typically contain lycra and are relatively expensive. The fabric-laminated substrate is then heated so that substrate sags sufficiently as shown in FIG. 1B. The sagging temperature for substrates of the type suitable for an article such as a door panel are quite high. At such temperatures (generally in excess of 220° F.) some types of fabrics are scorched. Scorched fabric does not have the aesthetic appeal suitable for vehicle interiors and the fiber texture is damaged.

Assuming that a substrate which sags at a lesser temperature (for example, a temperature on the order of 180° F.) were usable, the finished product would nonetheless not be satisfactory. In this regard, FIG. 1C shows the placement of the sagging fabric-laminated substrate onto the male mold 20. As a vacuum is applied to vacuum holes 26 in the male mold 20, the vacuum affects the substrate for the shaping of the substrate but there is a tendency in the nonplanar corner regions for the fabric to separate from the substrate.

While thermoplastic vacuum molding techniques have been employed in the textile industry to give a three-dimensional shape to thermoformable, stretchable textile fabrics, such techniques cannot be used to securely adhere a fabric onto a rigid, nonplanar substrate for the production of an article such as an interior door panel incorporated into a vehicle such as an automobile. In this regard, U.S. Pat. No. 3,962,392 to Conner uses a thermoformable sheet plastic material as a barrier to air flow in a vacuum forming operation wherein a thermoformable textile fabric is drawn into a mold cavity. Although some interlock occurs between the fabric and the plastic to prevent the fabric from slipping on the plastic and loosing its shape, the fabric is taken off the plastic so that the fabric alone can be used as a component of an article of apparel.

In view of the foregoing, it is object of the present invention to provide a vacuum molding process wherein a single piece of material such as fabric is easily and securely adhered to a substrate and whereby the substrate is given a nonplanar configuration, and to provide an article produced by said process.

An advantage of the present invention is the provision of a process whereby a single piece of fabric is adhered to a nonplanar rigid substrate in a single adhering step.

Another advantage of the present invention is the provision of a process whereby a relatively inexpensive single piece of fabric is adhered to a nonplanar substrate.

Yet another advantage of the present invention is the provision of a process whereby a single piece of material is easily adhered to a rigid substrate in manner whereby the substrate is given a nonplanar contour which is closely replicated in the contour of the fabric adhered thereto.

SUMMARY

A vacuum molding process for adhering a porous, foam-backed fabric to a thermoplastic substrate and for providing a nonplanar contour to the substrate with fabric adhered thereto. The porous, foam-backed fabric is loosely positioned over a female mold. The substrate is heated sufficiently for the substrate to sag. The sagging substrate is deposited over the female mold in a manner whereby the substrate contacts the fabric around an effective mold perimeter. A vacuum applied through the female mold is transmitted through the porous foam-backed fabric and attracts the sagging substrate into the mold. The attraction causes contact and adhesion of the heated substrate and the foam-backed fabric.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1A:
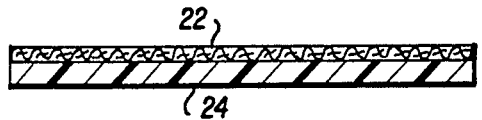
FIGS. 1A, 1B, and 1C are cross-sectional views showings sequential steps involved in a prior art process wherein an effort is made to adhere a fabric to a thermoplastic substrate and to form the thermoplastic substrate to have a nonplanar contour.
Figure 1B:
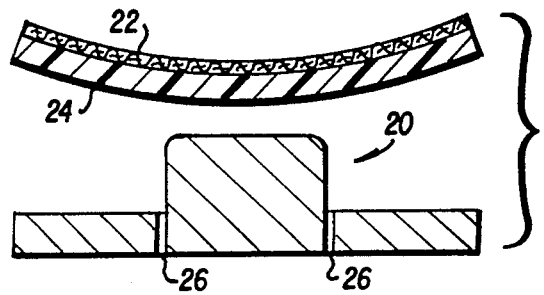
Figure 1C:
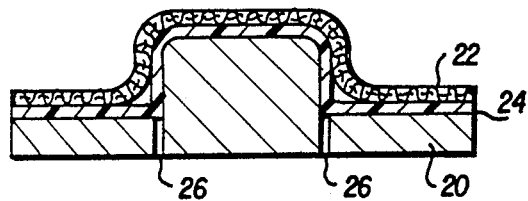

FIGS. 2A through 2E show sequential steps involved in the process of the invention wherein a material such as fabric is adhered to a thermoplastic substrate as the substrate is given a nonplanar contour. As shown FIGS. 2 and 3, the process involves the use of a female mold 30. The female mold 30 shown in FIGS. 2 and 3 is configured in accordance with the present invention to produce a particular article, namely an interior door panel for a vehicle such as an automobile, a van, or a recreational vehicle. It should be understood that the female mold can be configured and used in accordance with the method of the present invention to produce other types of articles having either vehicular or nonvehicular application.

The particular female mold 30 shown in FIGS. 2 and 3 has a casement 32 comprised of sidewalls 32A, 32B, 32C, and 32D, and a bottom wall 34. For the female mold 30 shown in FIGS. 2 and 3, the interior edges 36A, 36B, 36C, and 36D of respective sidewalls 32A through 32D serve as an effective mold perimeter 36 and bound a female cavity portion 38 of the mold.

The mold casement 32 substantially surrounds the sides and bottom of a molding form 40 which defines the female cavity portion 38. The molding form 40 has a plurality of surfaces 42 which are configured in accordance with the desired shape of the article to be produced by the present method. For the female mold 30 of FIGS. 2 and 3, which is used to produce an interior door panel of a vehicle, the surfaces 42 include surface 42A (used produced a horizontal surface of an armrest ledge); surface 42B (used produced a vertical surface of an armrest ledge); surface 42C (used to produced a lower ramping surface of an armrest); and, surface 42D (used to produce a door panel upper cavity-defining surface). A plurality of vacuums hole 44 are provided in the molding form 40 and are especially provided at spaced intervals along lines which form the intersection of mold surfaces. Each vacuum hole 40 communicates with a vacuum port 46 which is connected to a suitable source of vacuum (unillustrated).

The method of the invention also involves the utilization of a material, such as a piece of fabric. Preferably a piece of fabric 50 such as that shown in FIGS. 2 and 3 as having a flexible foam (such as flexible polyurethane foam 52) already adhered to the fabric backside is employed. Unless specified otherwise, as used herein and in the claims the terms "material" and "fabric" include both a flexible foamback fabric and a fabric which is not backed with foam. The fabric 50 and foam 52 must be sufficiently fluid porous so that negative pressure associated with application of a vacuum can be transmitted through and exerted through the fabric 50 and the foam 52.

In the above regard, the fabric 50 can be any of a number of fabric types, including polyester, for example. Thus, the fabric need not be thermoformable.

The flexible foam 52 can be any open-celled foam, such as a flexible urethane foam. The foam thickness is preferably not greater than $\frac{1}{8}$ inch. The foam 52 has been laminated to the fabric 50 at a time when the fabric 50 was under the least possible stress (i.e., the fabric was not stretched during lamination). The fabric 50 used for the present invention is not the conventional non-porous (e.g., vinyl-backed) fabric heretofore used in vacuum forming techniques. Moreover, the fabric 50 and foam 52 utilized in the present invention can be capable of less than 60% dimension elongation, i.e., less than the 60% to 70% minimun fabric dimensional elongation required in the conventional vacuum forming techniques wherein fabrics are utilized. The fabric 50 and foam 52 should be capable of reasonably compatible dimensional elongation.

Figure 2A:
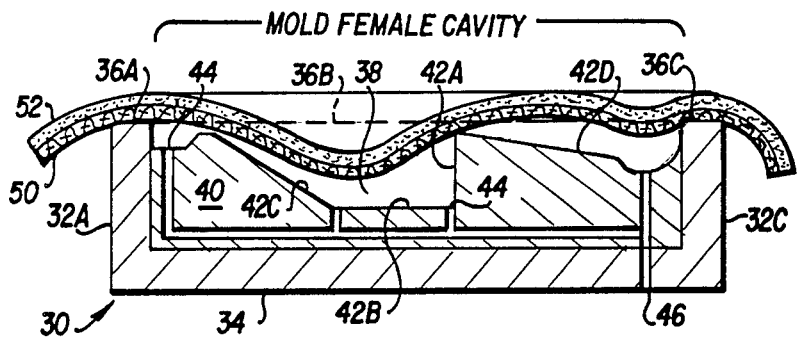
FIGS. 2A through 2E are cross-sectional views showing sequential steps involved in a process of the present invention wherein fabric is adhered to a thermoplastic substrate as the thermoplastic substrate is given a nonplanar contour.
Figure 3:
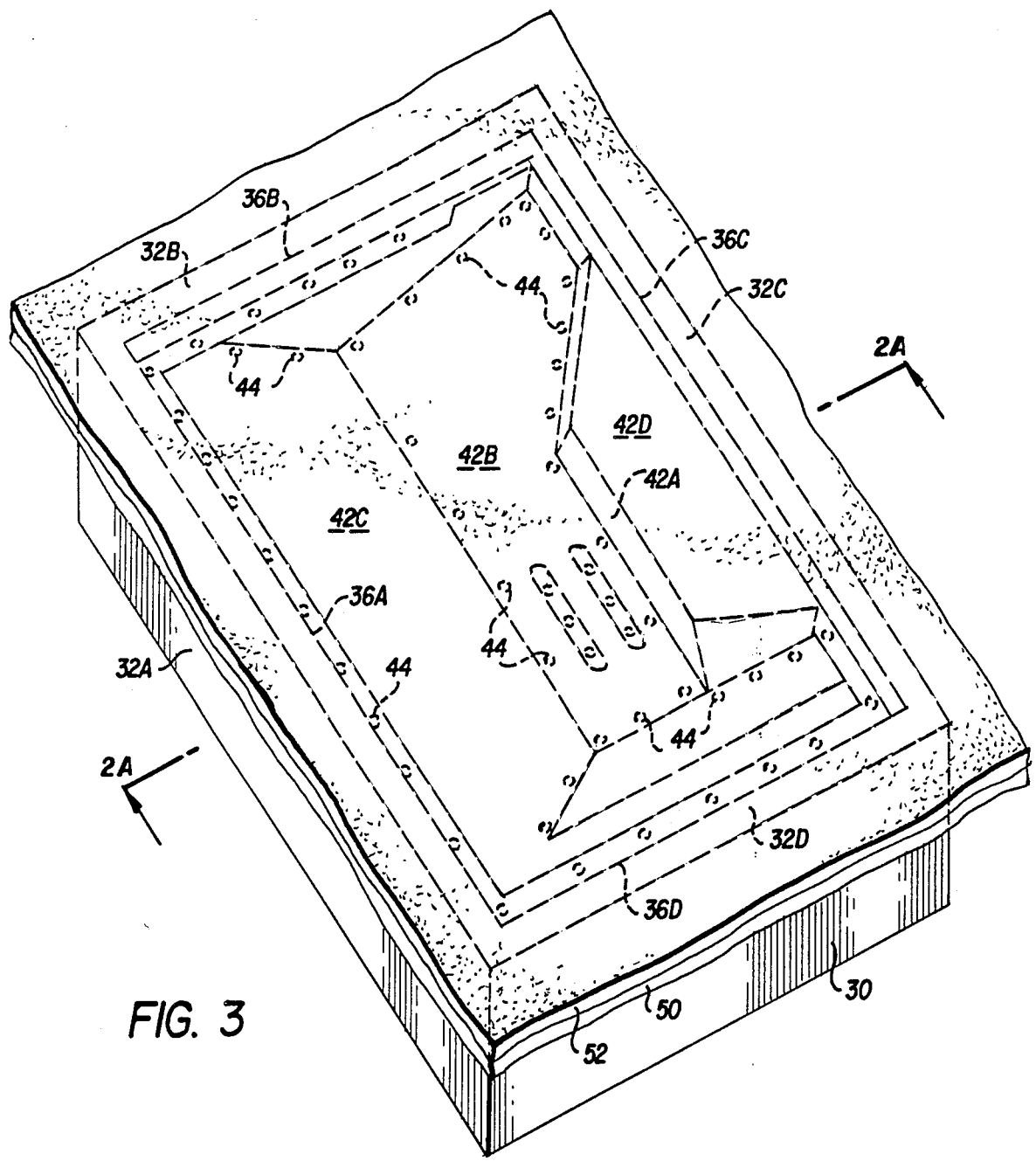
FIG. 3 is a perspective view of the step shown in FIG. 2A.

According to a first step of the method, the fabric 50 is loosely positioned with the fabric face down over the upwardly-facing female mold 30 as shown in FIGS. 2A and 3. The fabric 50 extends at least over the perimeter 36 which boarders the female cavity portion 3B. It is important that the fabric 50 not be held taut over the perimeter 36, but instead lie naturally loose as occurs when the fabric 50 is simply draped over the female mold 30.

According to a second step of the method, a thermoplastic substrate 60 is heated until the substrate 60 "sags" and flows. Thermoplastic substrates thus far found suitable for the present invention include extrudable thermoplastics such as polystyrene, ABS (a polymerized mixture of styrene, acrylonitrile and nitrile rubber), polyproplyene, polyethlene and polyvinylchloride. The substrate 60 is preferably on the order of about 0.150 inches thick. As seen hereinafter, the thermoplastic substrate 60 is heated to a temperature at which the thermoplastic substrate 60 is in a semi-liquid state and can flow sufficiently to create a strong mechanical adhesion between the fiber 50 and the substrate 60. In this regard, when a fabric 50 without foam backing is used, a mechanical adhesion is treated between the fibers of the fabric and the thermoplastic substrate 60. When a fabric 50 having a foam backing 52 is employed, a mechanical adhesion is created between the open cells of the foam 52 and the thermoplastic substrate.

Figure 2B:
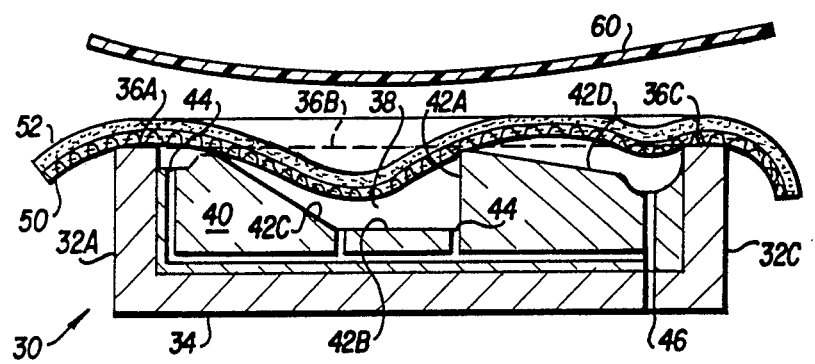

In the above regard, in one example a thermoplastic substrate 60 of ABS (Monsanto 752 grade) is heated to 290 degrees Farenheit in order for the substrate 60 to flow sufficiently to create a strong mechanical adhesion. While this particular substrate can be vacuum-formed when heated to 270 degrees, greater heating is required to cause the desired strong mechanical adhesion. The temperatures at which thermoplastic substrates sag and flow vary from substrate to substrate, but for most conventional substrates can be determined from handbooks well known to those skilled in the art, such as Modern Plastics Encyclopaedia for example. FIG. 2B shows a sagging semi-liquid substrate 60 having its ends held (by unillustrated means over the female mold 30.

Figure 2C:
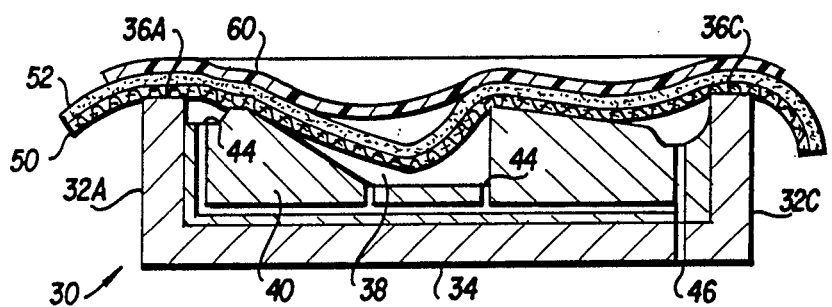

According to a third step of the method shown in FIG. 2C, the sagging semi-liquid substrate 60 is deposited onto a foam-backed fabric 50 lying in the upwardly-facing female mold 30. It is apparent that the substrate 60 is of sufficiently large size to contact the fabric 50 all around the mold effective perimeter 36. As shown in FIG. 3C, however, the substrate 60 does not necessarily contact the foam-backed fabric 50 and all interior points of the female cavity portion 38 of mold 33 since gaps may exist between the substrate 60 and the fabric 50 at interior points.

Figure 2D:
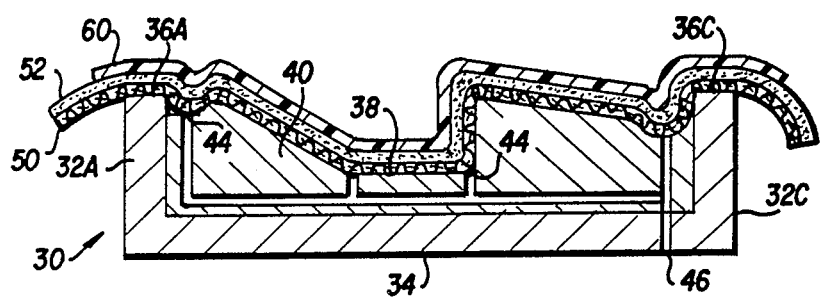

According to a fourth step of the method, shown in FIG. 2D, a vacuum is applied essentially immediately after the sagging semi-liquid substrate 60 is deposited on the foam-backed fabric 50 in mold 30. The vacuum is applied through vacuum holes 44. The vacuum must be sufficiently strong not only to attract the fabric 50 and substrate 60 into the female mold 30 so that fabric 50 and substrate 60 acquire the shape or contour of the female mold, but strong enough to pull the flowing thermoplastic into the fibers of the fabric (or, in the case of a foam-backed fabric, into the cells of the foam). The vacuum strength must therefore be on the order of at least 17 inches of Mercury, and is preferably about 25 inches of Mercury.

The foam backing 52 serves as an insulator to protect a heat-damagable fabric 50 from the high temperatures of the heater thermoplastic substrate 60 deposited thereover. In this regard, the thickness and type of foam backing 52 can be so chosen to both permit fluid transmission and preeclude or at least retard heat transmission therethrough.

After the vacuum is applied, the resulting article need stay in the mold 30 only long enough for the particular thermoplastic used to sufficiently cool so that article deformation will not occur upon article removal. For some thermoplastics the mold time can be as short as 20 seconds; for others (such as polyethylene) 3 to 4 minutes is required.

Prior to the inventor's development of the afore-described process, it was believed that a randomly loose porous fabric, placed on a female vacuum mold and having a saging semi-liquid thermoplastic substrate deposited thereover, would randomly wrinkle upon the application of the vacuum. However, the article which resulted from the performance of the afore-described process proved essentially wrinkle-free and of very fine quality. In this respect, the substrate 60 forms a sea about the effective mold perimeter 36 whereat the substrate 60 contacts the foam-backed fabric 50. The porosity of the fabric 50 and the foam 52 permit the transmission of the negative fluid pressure associated with the vacuum to the substrate 60, thereby attracting the substrate 60 and causing the substrate 60 to, act as a press against the foam-backed fabric 50 positioned over the mold 30. The press-type action of substrate 60 evenly drives the foam-backed fabric 50 into the female mold 30.

When the thermoplastic of the substrate 60 cools, a strong mechanical adhesion forms between the substrate 60 and the fabric 5. The strong mechanical adhesion results from the vacuum-attracted flow of the semi-liquid thermoplastic into the fabric 50 and the mechanical bonding between tne fabric 50 and the substrate 60 that occurs when the substrate 60 cools. In embodiments wherein the fabric is not foam-backed, the semi-liquid thermoplastic flows into the fabric fibers. In foam-backed embodiments, the semi-liquid thermoplastic flows into open cells comprising the foam 52.

The mechanical adhesion between the fabric 52 and the substrate 50 maintains the deserved shaping of the fabric 50 in accordance with the non-planar configuration of the female mold 30. That is, upon cooling of the substrate 60 the fabric 50 assumes the shaping of the substrate 60 by virtue of the mechanical adhesion of the fabric 50 to the substrate 60, rather than by any deformable qualities of the fabric itself.

Figure 4:
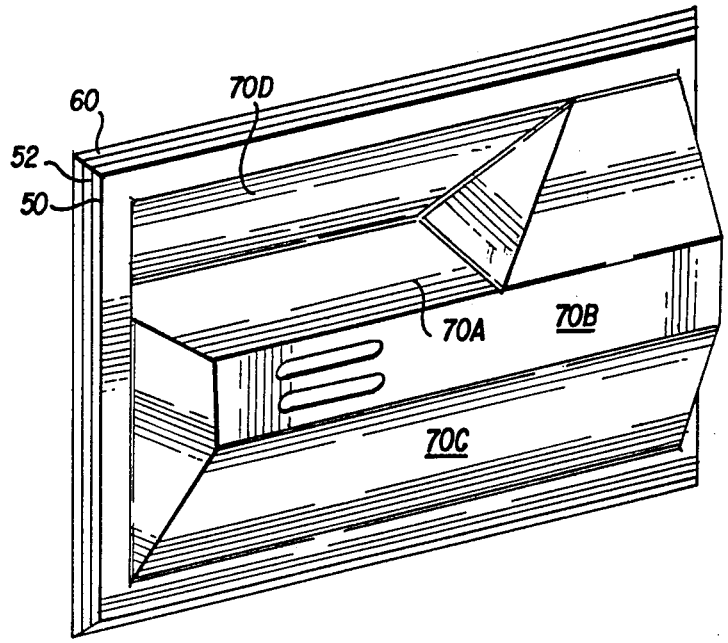
FIG. 4 is a perspective view of an article produced by the process of the steps shown in FIGS. 2A through 2E.
Figure 2E:
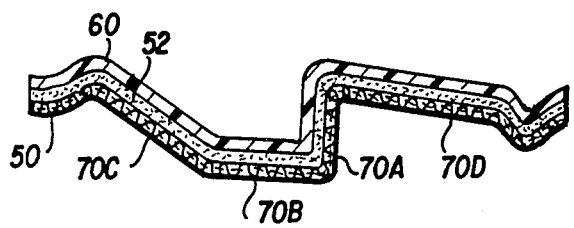

According to fifth step of the method, the article is removed from the mold 30 and trimmed. FIGS. 2E and 4 show a removed article 70 which, as mentioned before, is an interior panel for a vehicle such as an automobile. In accordance with the configuration of the female mold 30, the door panel 70 has an armrest horizontal surface 70A; an armrest vertical surface 70B; an armrest lower ramp surface 70C; and, a door panel upper cavity-forming surface 70D. Formed with such surfaces, the contour of the panel 70 (which is oriented toward the interior of the vehicle) is nonplanar. The surface or the panel 70 is evenly coated in wrinkle-free manner with foam-backed fabric. The panel 70 is durable but lightweight.

Other articles are formable in accordance with the method of the present invention, including vehicle-related interior body parts such as headliners, dashboards, and aircraft cabin panels. Although foam-backing of this fabric is preferred for most applications for aesthetic reasons and acoustic reasons, it is understood that foam-backing is not required and that the aforementioned steps of the method are performable with a material that is not foam-backed.

While in the present description the interior edges 36A through 36D of casement 32 serve as an effective mold perimeter, it should be understood that in other embodiments relatively elevated portions of mold form surfaces near extremities of a mold may serve as part of the effective mold perimeter.

While the invention has been particularly shown and described with reference to the preferred embodiment thereof, it will be understood by those skilled in the art that various alterations in form and detailed may be made therein without departing from the spirit and scope of the invention.

The embodiments of the invention in which an exclusive property or privilege is claimed are defined as follows:

1. A vacuum molding process for securely adhering a piece of fabric to a thermoplstic substrate, said process comprising the steps of:

positioning a piece of fabric loosely over a female mold, said female mold having a plurality of non-planar surfaces configured in accordance with a desired shape, said piece of fabric extending beyond the perimeter of said mold and being sufficiently porous to transmit therethrough the attractive force of negative fluidic pressure;

heating a thermoplastic substrate at least to a temperature at which said thermoplastic substrate is in a semi-liquid state and can flow sufficiently to penetrate said piece of fabric to form a mechanical adhesion between said substrate and said fabric;

depositing said thermoplastic substrate onto said piece of fabric in said female mold;

applying negative pressure through said female mold, said negative pressure being of sufficient degree and applied in a manner whereby an attractive force associated with said negative fluidic pressure:

(i) is transmitted through said piece of fabric and attracts said heated thermoplastic substrate into a female cavity portion of said mold to impart a desired shaping to said substrate; and, (ii) attracts flowing thermoplastic of said substrate into said piece of fabric whereby said semi-liquid thermoplastic penetrates said piece of fabric sufficiently for the formation of mechanical adhesion between said substrate and said fabric;

permitting said thermoplastic substrate to harden into a ridig panel composite with the mechanical adhesion between said fabric and said thermoplastic substrate maintaining a desired shaping of said piece of fabric.

2. The process of claim 1, wherein said heated thermoplastic substrate is deposited onto said mold in a manner whereby said substrate contacts said piece of fabric around said mold effective perimeter.

3. The process of claim 1, wherein said piece of fabric has an open-celled foam on a backside thereof, said foam being sufficiently porous with respect to a said negative fluidic pressure, and wherein said thermoplastic substrate at least partially flows into open cells comprising said foam.

4. The process of claim 1, wherein said substrate is a thermoplastic material chosen from a group consisting of ABS, polystyrene, polyproplyene, polyethylene, and polyvinylchloride.

5. The process of claim 1, wherein said piece of fabric has a dimensional elongation factor which is less than 60%.

6. An article comprising a piece of fabric securely adhered to a substrate, said article being produced by the process of claim 1.

7. An article having a piece of fabric securely adhered to a substrate, said article being produced by the process of claim 3.

8. An article having a piece of fabric securely adhered to a substrate, said article being produced by the process of claim 4.

9. An article having a piece of fabric securely adhered to a substrate, said product being produced by the process of claim 5.

10. An interior body panel for a vehicle, said panel having a piece of fabric securely adhered to a rigid substrate, said panel being produced by the process of claim 1.

11. A process for securely adhering a material to a thermoplastic substrate and for providing the substrate and material adhered thereto with a nonplanar contour, said process comprising the steps of:

placing a material comprising a fluid-porous fabric having open-celled foam baking adhered thereto over a female mold cavity, said female mold having a plurality of non-planar surfaces configured in accordance with a desired shape, said placing being conducted in a manner whereby said foam backing is oriented away from said female mold cavity and whereby said material is draped in non-taut fashion over an area greater than the effective mold perimeter;

heating a thermoplastic substrate to a temperature at which said thermoplstic substrate is in a semi-liquid state and can flow sufficiently into said open-celled foam backing to eventually form a mechanical adhesion between said foam backing and said thermoplastic substrate;

positioning said thermoplastic substrate over said material draped over said female mold cavity in a manner whereby said substrate contacts said material proximate said mold effective perimeter;

applying negative fluidic pressure through said female mold in a manner whereby an attractive force associated with said negative fluidic pressure is transmitted through said material to attract said substrate;

using said heated thermoplastic substrate as a press during said application of negative fluidic pressure to drive said material against said female mold cavity and thereby impart a nonplanar contour to said material;

forming a mechanical adhesion between said material and said thermoplastic substrate by causing said heated thermoplastic substrate to flow sufficiently into said open-celled foam backing; and, permitting said thermoplastic substrate to harden into a rigid panel composite with the mechanical adhesion between the material and the thermoplastic substrate serving to maintain said nonplanar contour in said material.

12. The process of claim 11, wherein said material is selected so that said fabric and said foam backing both have dimensional elongation factors which are less than 60%.

13. The process of claim 11, wherein the thickness of said foam backing is selected to provide thermal insulation between said fabric and said substrate and to be fluid porous whereby said negative fluid pressure can be sufficiently transmitted therethrough.

14. An article having material adhered to a substrate, said article being produced by the process of claim 11.

15. An article having material adhered to a substrate, said article being produced by the process of claim 12.

16. An article having material adhered to a substrate, said article being produced by the process of claim 13.

17. An interior panel for a vehicle such as an automobile, said panel comprising:

a thermoplastic substrate having a nonplanar configuration;

a piece of material substantially continuously covering said nonplanar substrate, said material comprising a fabric and an open-celled foam backing, said foam backing being disposed in contact with said substrate; and, bonding means for securely adhering said foam backing to said substrate, said bonding means including the mechanical bonding of cells comprising the foam and thermoplastic from said substrate which has penetrated said cells by heating said thermoplastic substrate to at least a semi-liquid state so that said thermoplastic flows sufficiently to penetrate said piece of material which was draped over a female mold having a desired nonplanar configuration, said diameter of said mold being smaller than the diameter of said fabric.

18. The process of claim 1, wherein said step of depositing said thermoplastic substrate onto said piece of fabric is conducted after said substrate has been heated but while said substrate is still flowing.

19. The process of claim 11, wherein said step of positioning said thermoplastic substrate over said material is conducted after said substrate has been heated but while said substrate is still flowing.

20. The process of claim 1, wherein said piece of fabric is placed in non-taut fashion over said female mold.

* * * * *